United States Patent [19]

Ringle

[11] 4,176,463
[45] Dec. 4, 1979

[54] WHEEL ALIGNMENT GAUGE ASSEMBLY AND ADAPTER THEREFOR

[76] Inventor: Gerald D. Ringle, 3025 W. U.S. 12, Michigan City, Ind. 46360

[21] Appl. No.: 915,381

[22] Filed: Jun. 14, 1978

[51] Int. Cl.$^2$ .......................................... G01B 11/275
[52] U.S. Cl. ............................................... 33/203.18
[58] Field of Search ................ 33/203.18, 203.19, 203, 33/337

[56] References Cited

U.S. PATENT DOCUMENTS

| 2,608,368 | 8/1952 | Bagge et al. | 33/203.18 X |
| 3,330,044 | 7/1967 | MacMillan | 33/203.18 |
| 3,488,023 | 7/1970 | Shooter et al. | 33/203.18 X |

Primary Examiner—Harry N. Haroian
Attorney, Agent, or Firm—Marmaduke A. Hobbs

[57] ABSTRACT

An alignment gauge assembly for a vehicle wheel having a spindle with a threaded outer end in which an adapter is mounted on the end of the threaded portion of the spindle and includes a shank in axial alignment with the spindle and a head on the shank having an outwardly facing surface at right angles to the axis of the shank and a center hole therein, the threaded end of the shank replacing the standard nut and washer on the end of the spindle. The head, and preferably the shank, are made of ferrous metal or other magnetic attractable material for mounting a caster and camber gauge thereon, using a permanent magnet in the gauge for attachment to the outwardly facing surface and a center pin for seating in the center hole. When mounted on the adapter, the gauge is in axial alignment with the wheel spindle and contains scales for determining the caster and camber of the wheel.

10 Claims, 5 Drawing Figures

WHEEL ALIGNMENT GAUGE ASSEMBLY AND ADAPTER THEREFOR

In the operation of automobiles and trucks, proper front wheel alignment is important in order to permit the wheels to roll without scuffing, dragging or slipping under various road operating conditions. Proper alignment results in safer driving, easier steering, longer tire life and less strain on the vehicle front end parts. Two important parameters of front end alignment are caster and camber, the former being the forward or backward tilt of the wheel spindle support at the top, i.e. the points through which the front wheels turn. The caster is measured in the number of degrees the center line of the spindle support is tilted from the true vertical. If the top of the spindle support is tilted back toward the driver's seat, the caster is positive, whereas, if the top of the spindle is tilted forward toward the front of the vehicle, the caster is negative, and the caster is zero when the spindle support is straight up and down. The camber is the inward or outward tilt of the wheel at the top, and the amount that the center line of the wheel is tilted from the true vertical is measured in degrees, outward tilt being positive camber and inward tilt being negative camber. While there are various instruments and systems employed for testing and correcting the caster and camber, most use magnets for mounting the instrument and are either complicated to use or are unreliable and inaccurate. Further, when magnesium wheels or simulated magnesium wheels are used, the wheel has a metal center piece which prevents the attachment of the instrument to the wheel by the use of a magnet, and, even if the center piece is removed, the center rim is not machined sufficiently accurately to receive an instrument.

The present invention involves the use of a caster-camber gauge which is mounted magnetically, either directly or indirectly, on the front wheel of the vehicle. When the gauge is mounted directly on the hub flange of the wheel, permanent magnets in the end of the gauge hold the gauge firmly on the hub flange with a pin seating in the lathe center hole in the front wheel spindle for obtaining proper alignment. This type of mounting arrangement has been found unreliable, since the hub flange is often out of alignment with the wheel proper, or is sufficiently corroded or dirty to prevent the gauge from seating in a position properly representing the position or condition of the wheel on the wheel spindle. With the alternative indirect arrangement, a rim adapter device is secured to the wheel rim and has a member extending diametrically from one side of the wheel to the other side, and the gauge is secured magnetically to the center of the cross member. This system depends on proper condition of the wheel and rim in order to obtain an accurate reading from the gauge to make the wheel adjustments, thus introducing an unreliable factor into the wheel alignment procedure, in that the rim is often bent or otherwise distorted. It is therefore one of the principal objects of the present invention to provide a wheel alignment gauge system which utilizes the wheel spindle as the mounting support for the gauge assembly, and which correctly and consistently provides the correct readings on the gauge for making appropriate wheel adjustment.

Another object of the invention is to provide a wheel alignment gauge assembly which is secured to the front wheel spindle by the use of a simple adapter threadedly attached to the spindle in place of the conventional wheel securing nut, and which can be adapted to most makes and models of automobiles and many pick-up and other types of trucks, without changing either the manner of mounting or operation of the gauge.

Still another object of the invention is to provide an adapter for mounting a wheel alignment gauge on the spindle of the vehicle front wheel, which is relatively simple in construction, design and operation, and which can be adjusted to the spindles of various automobiles with little or no change in the adapter.

Further objects and advantages of the present invention will become apparent from the following description and accompanying drawings, wherein.

Figure 1:
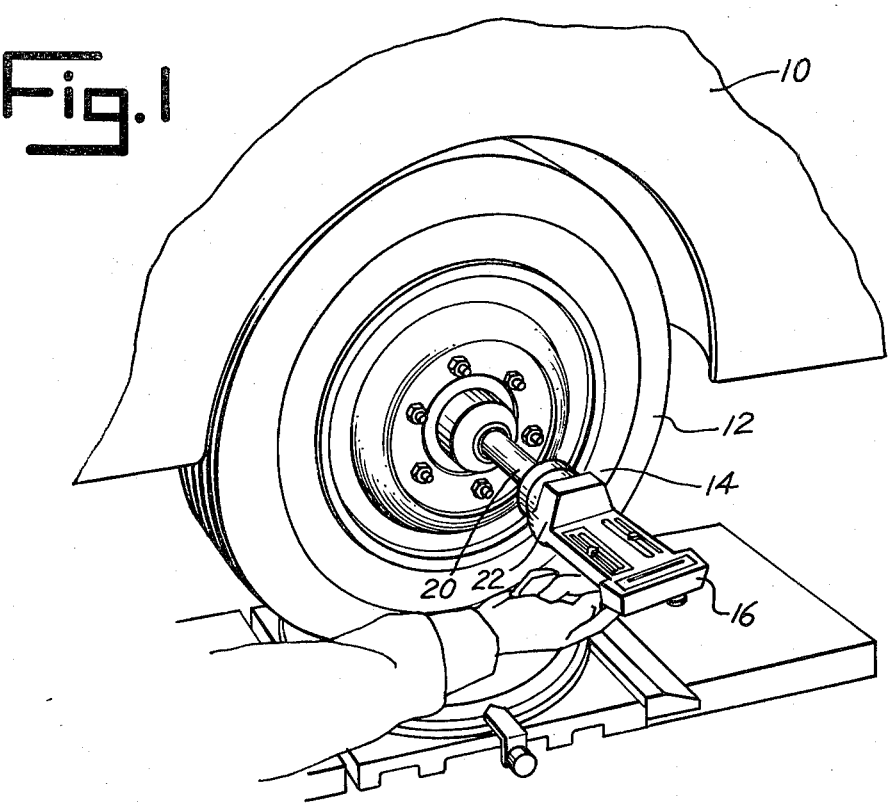
FIG. 1 is a perspective view of the wheel alignment gauge assembly, illustrating the manner in which it is used to align the front wheel of a standard automobile mounted on an alignment rack.
Figure 2:
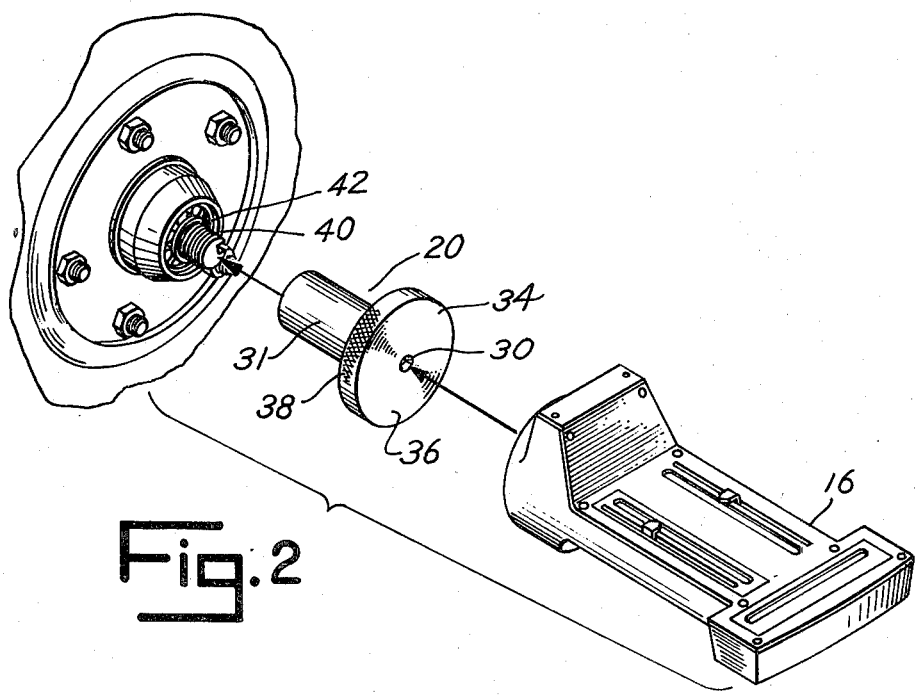
FIG. 2 is an exploded, perspective view of the wheel alignment gauge assembly shown in FIG. 1, showing a portion of the wheel and wheel assembly.

Referring more specifically to the drawings, and to FIG. 1 in particular, numeral 10 indicates generally an automobile, 12 one of the front wheels thereof mounted on an alignment rack, and numeral 14 indicates generally a wheel alignment assembly embodying the present invention. The assembly includes a caster-camber gauge 16 mounted on an adapter 20 which is threaded onto the end of the wheel spindle. The gauge shown is of the magnetically mounted type which mounts on the adapter and is held thereon by a plurality of permanent magnets in end 22 of the gauge. The details of the gauge are well known and are illustrated in U.S. Pat. No. 2,654,860 to Bender et al; however, there are wheel alignment gauges of types other than that shown in the drawings which may be used satisfactorily in the present wheel alignment gauge assembly.

Figure 3:
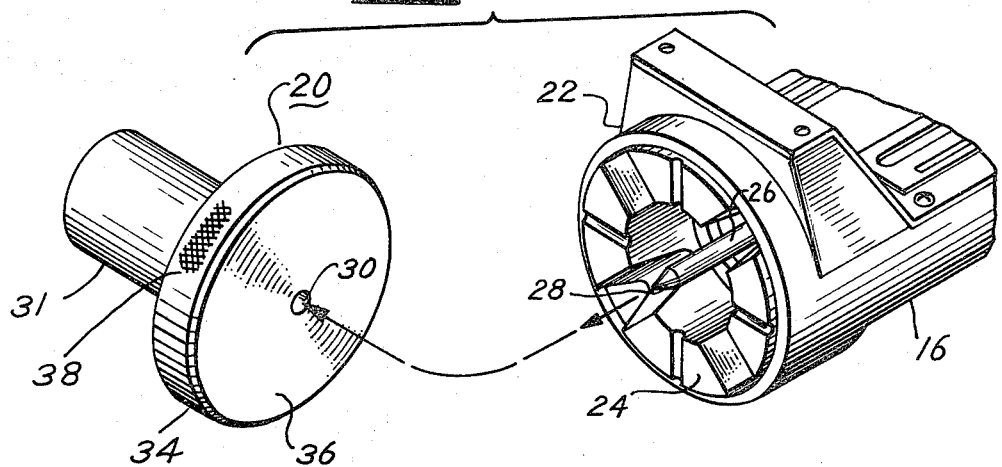
FIG. 3 is a perspective view of the wheel alignment gauge assembly shown in the preceding figures, illustrating the manner in which the gauge is mounted on the adapter.

In the gauge shown, magnet 24 has four poles rigidly mounted in the end 22 of the gauge and has sufficient strength to hold the gauge firmly on adapter 20. In order to assist the mounting of the gauge in proper position on the adapter, i.e. centering the gauge with respect to the center of the adapter, a pin 26 extends outwardly from the end of the gauge and has a pointed end 28 which seats in an axial hole 30 in adapter 20, the manner in which the gauge and the adapter are assembled being best illustrated in FIG. 3.

The adapter 20 consists of a shank 31 with an axial threaded opening 32 in one end and an enlarged disc shaped head 34 on the other end containing hole 30 for receiving pin 26. The adapter is constructed of steel, and the magnet attracts the head and seats firmly on face 36 of head 34, the head preferably having a knurled edge 38 to assist in mounting the adapter on the threaded portion 40 of the wheel spindle 42. The adapter is mounted on the spindle by removing the standard wheel nut from the spindle and then threading the adapter onto the spindle in place of the nut, with the forward end 44 of the shank seating firmly against the bearing to eliminate end play, plus placing the adapter or spindle extension in accurate alignment while holding the spindle and bearing. Since face 36 is machined to provide an accurate right angle relationship to the axis of shank 31, the gauge is retained in position on the adapter for making precise adjustments in the wheel alignment. In the embodiment of the invention illustrated in FIGS. 1 through 4, the adapter is constructed of a single piece of steel with the head 34 being integrally connected to shank 31, although, in this embodiment, the adapter will fit only one size and type of spindle.

In the operation and use of the foregoing wheel alignment gauge assembly, the hub cap and wheel dust cap are removed from the wheel and the standard nut and washers are removed from the wheel spindle. The adapter is then threaded onto the spindle and tightened to the point where the forward end 44 of the shank of the adapter is seated against the bearing, thus placing the adapter in correct alignment with the spindle and bearing. The gauge is then mounted on face 36 of head 34 with pin 26 seating in hole 30. The magnets thereafter hold the gauge firmly in place on the head of the adapter. With the gauge mounted on the adapter in the foregoing manner, the caster and camber are checked by the gauge and adjusted by the operator to obtain proper adjustment for these two parameters. The operation of the gauge is well known and readily available so that the operation of the gauge after it has been mounted in the foregoing manner will not be described herein, although reference may be made to the aforementioned Bender et al patent for convenience in understanding the manner in which the gauge operates in the present assembly.

After the adjustment has been made in the alignment of the wheels, the assembly is removed by unscrewing the adapter from the wheel, and the standard washers and nut are placed on the spindle. With the present wheel alignment gauge assembly, including the aforementioned adapter, accurate alignment can be obtained without reliance on defective wheels or wheel flanges, and the assembly operation can be performed rapidly without any special skill on the part of the operator.

Figure 5:
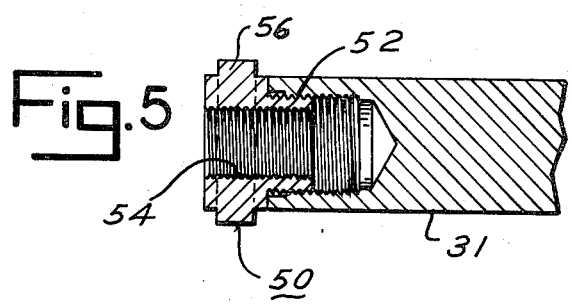
FIG. 5 is an elevational view of a modified form of the adapter on which the wheel alignment gauge is mounted.
Figure 4:
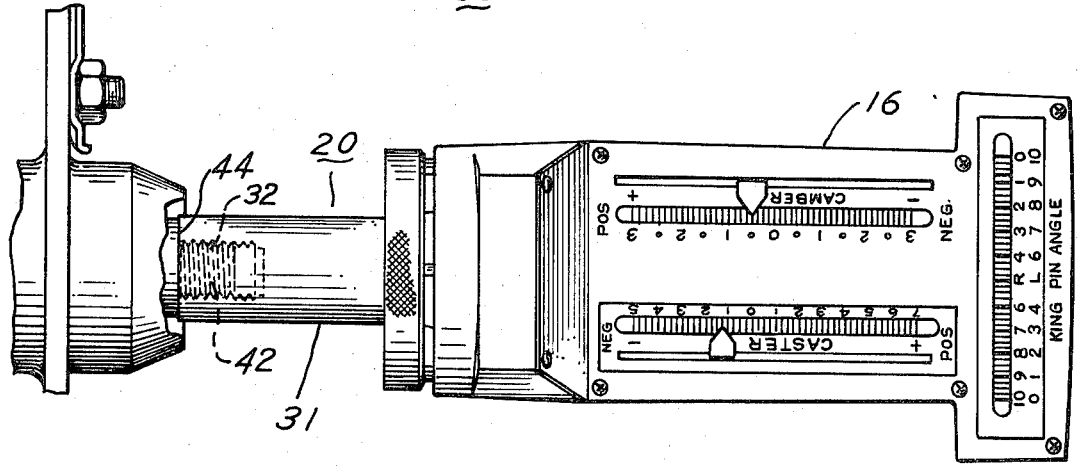
FIG. 4 is a top plan view of the wheel alignment gauge assembly, showing it mounted on the spindle of the wheel in preparation for a wheel alignment operation.

In the modification shown in FIG. 5, the adapter is provided with an insert 50 threaded both internally and externally at numerals 52 and 54. The external threaded portion 52 is threaded into the threaded portion of shank 31 and the threaded portion 54 of the insert is threaded onto the end of the spindle; thus, the adapter can be used effectively with spindles having different diameters and screw threads. Several different inserts can be provided in order to meet all requirements with respect to different makes and models of automotive vehicles. In order to assist in mounting the insert on the adapter and/or on the wheel spindle, a hexagonal portion 56 is provided on the insert for receiving a wrench. The adapter is used in the same manner with the insert as it is without the insert, as previously described herein.

While only one embodiment of the present wheel alignment gauge and adapter and one modification thereof have been described in detail herein, various changes and further modifications may be made without departing from the scope of the invention.

I claim:

1. An alignment gauge assembly for a vehicle wheel having a spindle with a threaded outer end, comprising an adapter having a shank with a threaded, axially disposed hole in one end thereof for mounting on the threaded end of the wheel spindle in axial alignment therewith, a head of magnetic attractable material disposed on and rigidly attached to the other end of said shank and having an outwardly facing surface on a plane at right angles to the axis of said shank and a means defining a center recess in the face thereof for receiving a centering pin, and a gauge having a permanent magnet therein seating on said outwardly facing surface, a center pin seating in said center recess for centering said gauge with respect to the axis of said shank, and scales thereon for determining the caster and camber of the wheel.

2. An alignment gauge assembly for a vehicle wheel as defined in claim 1 in which said shank is cylindrically shaped and said head is disc shaped and is joined integrally to the end of said shank.

3. An alignment gauge assembly for a vehicle wheel as defined in claim 2 in which said adapter is constructed of ferrous metal.

4. An alignment gauge assembly for a vehicle wheel as defined in claim 1 in which an insert is threaded into said threaded, axially disposed hole and contains an axially threaded hole disposed therein of a diameter smaller than said first mentioned axially disposed hole for threadedly receiving the end of a wheel spindle.

5. An alignment gauge assembly for a vehicle wheel as defined in claim 4 in which an annular portion is provided on said insert for receiving a wrench for inserting said insert in the threaded, axially disposed hole in said shank.

6. An adapter for an alignment gauge assembly for a vehicle wheel having a spindle with a threaded outer end, said adapter comprising a shank with a threaded, axially disposed hole in one end thereof for mounting on the threaded end of the wheel spindle in axial alignment therewith, a head of magnetically attractable material disposed on and rigidly secured to the other end of said shank and having a means thereon for receiving a gauge for determining the caster and camber of the wheel, and means defining a center recess in said head for receiving a centering pin.

7. An adapter for an alignment gauge assembly for a vehicle wheel as defined in claim 6 in which said head includes an outwardly facing surface on a plane at right angles to the axis of said shank, and a center hole in said surface.

8. An alignment gauge assembly for a vehicle wheel as defined in claim 6 in which said shank is cylindrically shaped and said head is disc shaped and is joined integrally to the end of said shank.

9. An alignment gauge assembly for a vehicle wheel as defined in claim 7 in which an insert is threaded into said threaded, axially disposed hole and contains an axially threaded hole disposed therein of a diameter smaller than said first mentioned axially disposed hole for threadedly receiving the end of a wheel spindle.

10. An alignment gauge assembly for a vehicle wheel as defined in claim 8 in which an annular portion is provided on said insert for receiving a wrench for inserting said insert in the threaded axially disposed hole in said shank.

* * * * *